United States Patent
McNeely

(10) Patent No.: US 7,489,730 B2
(45) Date of Patent: Feb. 10, 2009

(54) CROSS-ENCODING OF INFORMATION IN INDEPENDENT CHANNELS

(75) Inventor: David Lowell McNeely, Indianapolis, IN (US)

(73) Assignee: Thomson Licensing, Boulogne Billancourt (FR)

( * ) Notice: Subject to any disclaimer, the term of this patent is extended or adjusted under 35 U.S.C. 154(b) by 0 days.

(21) Appl. No.: 10/591,359

(22) PCT Filed: Mar. 9, 2004

(86) PCT No.: PCT/US2004/007114

§ 371 (c)(1),
(2), (4) Date: Aug. 31, 2006

(87) PCT Pub. No.: WO2005/099206

PCT Pub. Date: Oct. 20, 2005

(65) Prior Publication Data

US 2007/0186268 A1 Aug. 9, 2007

(51) Int. Cl.
*H04L 27/00* (2006.01)
(52) U.S. Cl. ............... 375/259; 375/267; 375/299; 375/347
(58) Field of Classification Search ............ 375/259, 375/267, 299, 347
See application file for complete search history.

(56) References Cited

U.S. PATENT DOCUMENTS

| | | | |
|---|---|---|---|
| 4,393,502 A * | 7/1983 | Tanaka et al. | 714/755 |
| 4,864,615 A | 9/1989 | Bennett et al. | |
| 4,930,502 A * | 6/1990 | Chen | 606/150 |
| 5,237,610 A | 8/1993 | Gammie et al. | |
| 6,424,717 B1 | 7/2002 | Pinder et al. | |
| 6,961,388 B2 * | 11/2005 | Ling et al. | 375/267 |

* cited by examiner

*Primary Examiner*—Ted Wang
(74) *Attorney, Agent, or Firm*—Joseph J. Laks; Paul P. Kiel

(57) ABSTRACT

Independent first and second information signals (content1 and content2) are transmitted over separate independent physical channels to a receiving location. Security is provided by encoding (12a) at least the first information by means of the second information to produce encoded signals (1', ... N'). The encoded signals and the second signals are received from the first and second channels at the second location (230). The encoded first signals are decoded at the receiving location by processing with the second signals. In some embodiments, the second information signals are encoded by processing with the first information signals. In a more general case, plural channels of information are "cross-encoded" by the information in plural other channels, and the plurality may be large.

15 Claims, 4 Drawing Sheets

CROSS-ENCODING OF INFORMATION IN INDEPENDENT CHANNELS

CROSS-ENCODING OF INFORMATION IN INDEPENDENT CHANNELS

This application claim the benefit, under 35 U.S.C. § 365 of International Application PCT/US 2004/007114 filed Mar. 9, 2004, which was published in accordance with PCT Article 21(2) on Oct. 20, 2005 in English.

FIELD OF THE INVENTION

This invention relates to the encoding of information, and more especially to encoding of first information traversing a first channel to a location by means of second information traversing a second channel to the location.

BACKGROUND OF THE INVENTION

Current television and or radio services often provide pay-per-use or conditional access to program content. Customers who do not pay for the privilege of receiving the content are prevented from receiving the signals by encoding, and often by encrypting, the signals which contain the content. The term "encoding" is used herein for encoding, scrambling, and encrypting, and "decoding" for decoding, descrambling, and decryption. Paying customers receive a decoding key so that they may decode the encoded content for use.

Unfortunately, some persons may receive the encoded signal and extract the key, either on- or off-line, and may thereby avoid paying the fee for use of the content. FIG. 1 is a simplified block diagram of a cable television system 10 including one subscriber. In the system of FIG. 1, video or music content 1, which is to be made available as pay-per-view, is applied to an encoder 12a. Encoder 12a encodes the content with the aid of a key produced by a key generator 14a, which is applied to an input port 12ai, to produce encoded first content. The encoded first content produced by encoder 12a is applied to a frequency upconverter 16a, which converts the frequency to a unique frequency range or channel, centered on a frequency f1. Second content 2, which is to be made available to all subscribers, is applied directly to a second frequency upconverter 16b, which converts the unencoded content to a second unique frequency range. System 10 of FIG. 1 includes other frequency upconverters and may include other encoders, such as encoder 12N, which encodes content N by means of a key, which may be the same key as that used for encoder 12a, or which may be a different key from a generator 14N, applied to its encoding input port 12Ni. The encoded output of encoder 14N is applied to an upconverter 16N for conversion to a frequency range fN, different from the other frequency ranges. The encoded and unencoded signals on frequencies f1, f2, . . . , fN are applied to a frequency-sensitive combiner 18, which combines the signals onto a single path, which is the system television transmission path or line 20 (which may be a coaxial cable or an optical fiber).

The many carriers at the various frequencies f1, f2, . . . , fN flow along the cable 20 toward the subscribers. It should be understood that each separate carrier frequency on the cable system 10 constitutes a single channel which carries only one content. At any given subscriber's location, a portion of the signal including carriers f1, f2, . . . , fN is removed from the transmission path 20, as by a directional coupler 22, and carried to the subscriber's location, designated 24 in FIG. 1. At the subscriber, the signal is made available either directly to a television receiver 26, or if the system carrier frequencies are different from conventional television carrier frequencies, or if decoding of content are desired, the signal is made available to the television receiver 26 by way of a receiver/decoder 30. Receiver/decoder 30 receives only one channel, so receives from the cable only one channel.

When the subscriber at location 24 wishes to view unrestricted content, the television receiver 26 or the receiver portion of receiver/decoder 30 is set to select the appropriate one of the frequency ranges flowing in transmission path 20 (the desired channel), and the content may be viewed or listened to without more.

If the subscriber wishes to use conditionally restricted content, the television receiver (or monitor) 26 or the receiver portion of receiver/decoder 30 is set to select the appropriate one of the frequency ranges flowing in transmission path 20. However, this is insufficient to allow the content to be used. In order to use the conditionally restricted content, the subscriber must obtain a suitable decoding key for use in operating the decoding algorithm at his receiver/decoder. Many methods of obtaining the key are known, such as purchase of a card in a bricks-and-mortar store. One known way to obtain a key is for the subscriber to use a telephone to call a service center affiliated with the cable company, identify himself and make the appropriate payment, and receive the key electronically over the transmission path 20 of FIG. 1.

Some persons may attempt to obtain the use of the conditionally restricted content by storing the encoded content in a memory associated with a computer, and using the processing power of the computer to attempt to determine the encoding key or algorithm. In FIG. 1, a sample of the signal received from the receiver/decoder 30 at location 24 is made available to a computer 34. Computer 34 may be used to store the key transmitted over path 20, the encoded signal received by the receiver portion of receiver/decoder 30, or both. With the key and or signal stored, it or they can be manipulated by computer algorithms to attempt to extract the encoding algorithm, key, or both. With that information available, the encrypted information content becomes available to the subscriber at location 24, notwithstanding that he has not paid for the content.

Improved methods are desired for protection of information against unauthorized use.

SUMMARY OF THE INVENTION

A method according to an aspect of the invention is for securely transmitting first information from a first location to a second location by way of a first channel. The method comprises the steps of, at the first and second location, acquiring second and additional information which is independent of the first information, and time aligning the second and additional information at both the first and second locations. At the first location, the first information is related with the second and additional information by means of a first function to thereby generate a transmitter signal for transmission, and the resulting signal is transmitted from the first location to the second location by way of a first signal channel. At the second location, the transmitter signal is related to the second and additional information with a second function which is the reverse of the first function, to thereby recover the first information. In one particular mode of the method, the first and second functions are XOR functions. The step of acquiring the second and additional information at the second location may includes the steps of receiving the second and additional information by way of individual, independent signal channels. In a particularly advantageous version of this method, at least some of the second and additional information is transmitted from the first location to the second location. The step of transmitting at least some of the second and additional information from the first location to the second location may be performed by way of at least one signal channel independent of the first signal channel. The step of transmitting at least some of the second and additional information from the first location to the second location may be performed by transmitting each of the second and additional information by way of a single signal channel independent of the first signal channel for each individual one of the second and additional information. In a particularly advantageous version of the method, the step of at the second location, relating the transmitter signal to the second and additional information with a second function, is performed in concert with a receiver able to simultaneously receive multiple channels including the first signal channel, and the signal channels for each individual one of the second and additional information.

A method according to an aspect of the invention is for securely transmitting first and second information from a first location to a second location. The method comprises the step of processing the first information by means of at least the second information to thereby generate processed first information. The second information is processed by means of at least the first information to thereby generate processed second information. The processed first and second information are transmitted separately by way of independent first and second physical channels, respectively, to the second location. At the second location the processed first information is reverse processed by use of at least the processed second information. Reverse processing of the processed second information may be done by the use of at least the processed first information.

In a particular mode of the method, the step at the second location of reverse processing the processed first information by use of at least the processed second information includes the step of independently receiving the processed first information from the first independent channel and independently receiving the processed second information from the second independent channel. In a preferred mode of this method, this latter step is performed in or by an integrated circuit.

According to another aspect of the invention, a receiver is provided for simultaneously recovering at least first information received in processed form by way of a first independent physical channel and second information by way of a second independent physical channel. The first information transmitted over the first physical channel is processed before transmission in conjunction with second information to generate processed or encoded information. The second information is transmitted to the receiver over a second independent channel. The receiver comprises means for receiving the processed first information from the first physical channel, and also comprises means for receiving the second information from the second independent channel. A processing means processes the first processed information in conjunction with the second information to extract the first information from the first processed information. In that case in which the information transmitted over the second channel is encoded to form second processed information, the processing means also extracts the original second information, and for this purpose the receiver comprises further processing means for processing the first processed information with the second information to extract information relating to the form of the second information before the processing with the first information.

In a preferred embodiment of this receiver, all or most of the described functions are contained or lie within a single integrated circuit.

DESCRIPTION OF THE INVENTION

Figure 1:
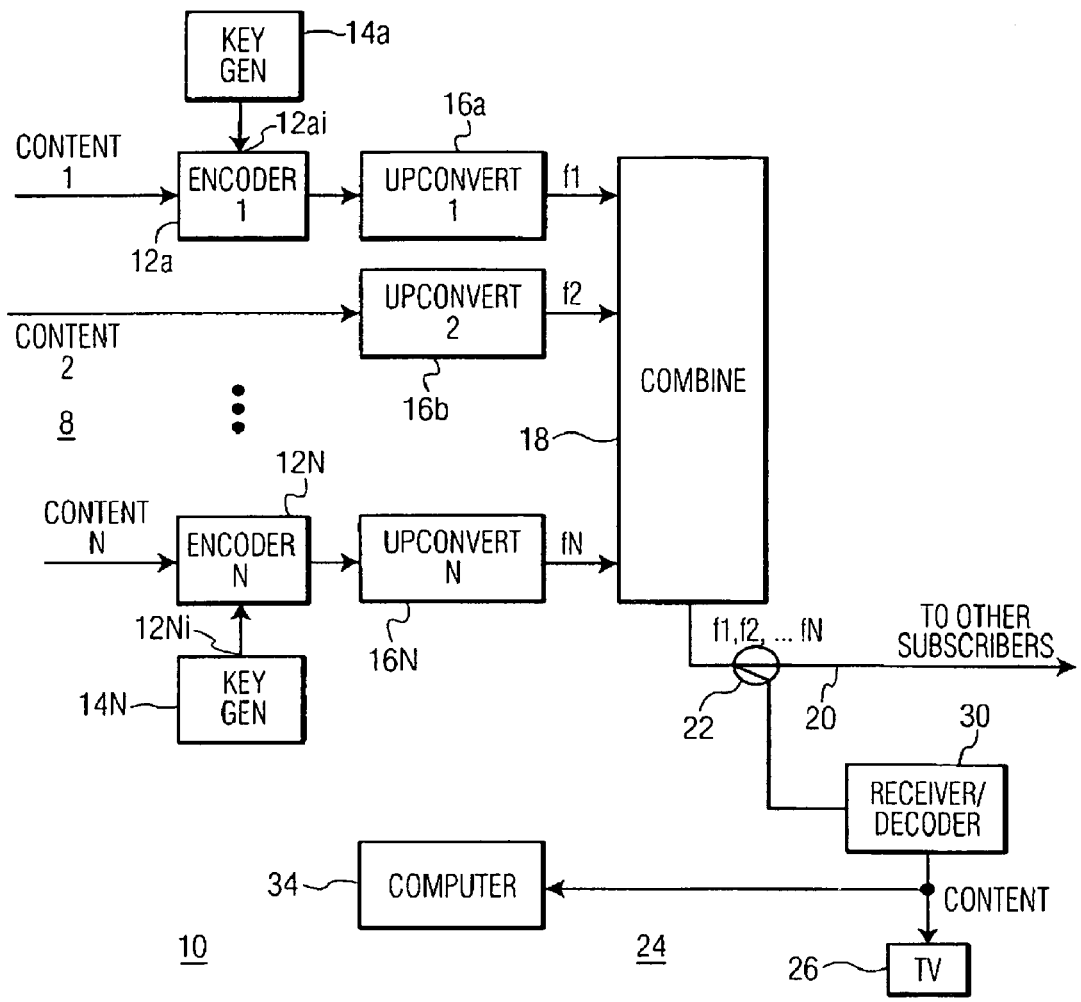
FIG. 1 is a simplified block diagram of a "cable television" system similar to those of the prior art, with one subscriber connection of the cable signal to a computer.
Figure 2:
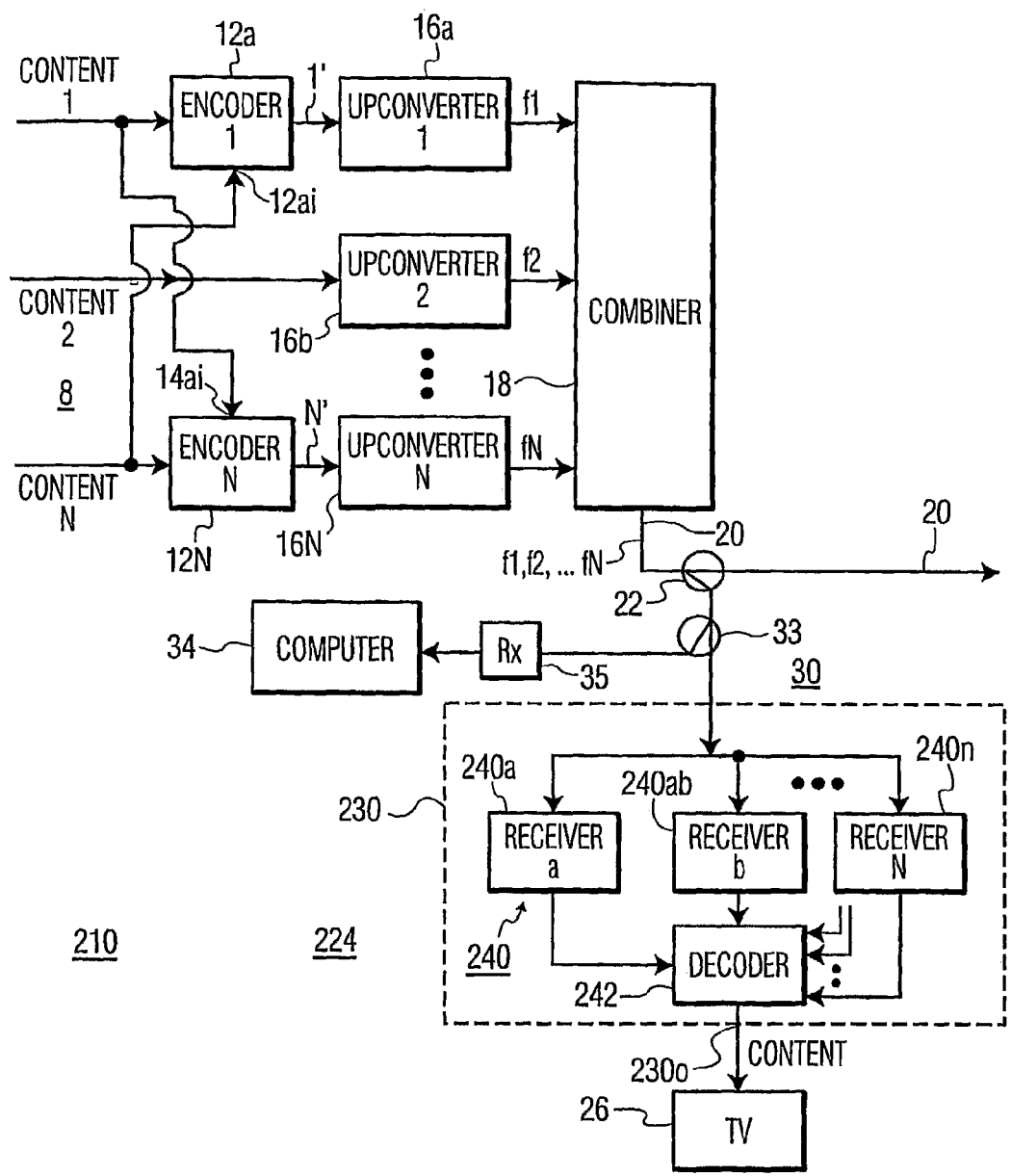
FIG. 2 is a simplified block diagram of a system cable television system similar to that of FIG. 1, and including connections related to the invention.

The invention makes use of multiple physical channels, corresponding, in the case of a cable television system, to separate (frequency-separated) channels. According to an aspect of the invention, the encoding of the conditionally restricted content flowing in one channel is performed by the use of information flowing in another channel of the system. In FIG. 2, a cable television system 210 is similar to the system of FIG. 1. A salient difference between the arrangement of FIG. 2 by comparison with that of FIG. 1 is that the key generators 14a, . . . , 14N of FIG. 1 are not used in the arrangement of FIG. 2. Instead, each encoder 14a, . . . , 14N receives, as its encoding stream, the information content of another channel. More particularly, in the arrangement of FIG. 1, first encoder 12a receives at its encoding signal input port 12ai the clear information content N, and $N^{th}$ encoder 12N receives at its encoding signal input port 12Ni clear information content 1.

As in the arrangement of FIG. 1, the encoded information content 1' from encoder 12a, is upconverted and applied at frequency f1 to transmission path 20 by combiner 18. Independently, the clear or unencoded content 2 is upconverted, and made available at frequency f2 on transmission path 20, and the encoded content N' of encoder 12N is upconverted by upconverter N, and made available at frequency fN on the transmission path.

At subscriber location 24 of FIG. 2, the combined signal from the transmission path 20 is made available by means of directional coupler 22. Unlike the arrangement of FIG. 1, the receiving arrangement 230 of FIG. 2 includes a set 240 including a plurality 240a, 240b, . . . , 240M of individual receivers, each capable of receiving content from one independent physical channel. The number of individual receivers in receiving arrangement 230 depends upon the number of channels which are used to perform encoding. Thus, in the arrangement as illustrated in FIG. 2, encoder 12a encodes content channel 1 with information from content channel 3, and encoder 12N encodes content channel N with information from content channel 1. Thus, only one additional channel of information is necessary to decode either content 1 or content N, so only two individual receivers 240a, 240b (or 240a, 240M, or any other set of two receivers) are needed to produce the two channels of content. If the information of content channel 1 were to be encoded by means of information from five or ten other channels, then the receiving arrangement 230 of FIG. 2 would require six or eleven receivers, respectively (one for the content channel, five or ten for the encoding information).

The encoded content from the desired number of receivers of set 240 of individual receivers of receiving arrangement 230 is applied to a decoder illustrated as a box designated 242. Decoder block 242 decodes at least one of the contents, such as content 1. It also has available, in the particular encoding arrangement illustrated in FIG. 2, the information required to decode two individual contents.

That is, since the channel 1 content is encoded with content N, and content N is encoded with content channel 1, receiving both encoded channels of content allows decoder 242 to decode both channels of information. At least one decoded content is made available from decoder 242 of FIG. 2 to television receiver 26.

In the arrangement of FIG. 2, the unscrupulous subscriber who wishes to extract the encoded signal or the "key" is presented with the difficulty that he does not know how the encoding is performed. Secondly, he has access for connection of his computer 34 only two possible connections (without disassembling the receiving arrangement 230). The first possible point to which he can connect his computer is at the output terminal 230o of receiving arrangement 230. At this location, he has available either the encoded content, or the decoded content if he has paid and the decoding information has been downloaded to the receiving arrangement 230. Presumably, the encoded content is not useful to him without more. If he has paid, then he has no incentive to attempt to extract the "key." In the ideal situation, the "key," which is information about which channels are related for encoding, can change from program to program, so the current decoding "key" is not useful for the next following program.

The second possible connection which the subscriber can make is by way of a further directional coupler or tap, illustrated as 33, to all the separate physical channels flowing on the cable 20. These physical channels are manifested in the form of separate carriers. While the subscriber may have a receiver, it is likely not a multichannel receiver such as receiver arrangement 230 of FIG. 2. Consequently, even with a single-channel receiver (RX) 35 connected to the tap 33 of FIG. 1, and with one channel of encoded information available to the computer for analysis, it will be very difficult to perform analysis to discover the encoding, because some of the relevant information is on another channel, and is not available to computer 34 of FIG. 2.

One possible method for encoding the various content channels is by exclusive-or (XOR) processing. As an example of the encoding which is possible using multiple information contents, consider four information content streams At, Bt, Ct, and Dt. Information bit stream At is replaced by a stream Ar=At XOR Ct; bit stream Bt is replaced by Br=At XOR Bt; bit stream Ct is replaced by Cr=Bt XOR CT XOR DT, and bit stream Dt is replaced by Dr=At XOR DT. As mentioned, the content which is used for the encoding can be changed from time to time, which may be implemented in this example by changing the XOR method.

At the receiver arrangement 230 of FIG. 2, the digital packets are appropriately time-aligned to compensate for differences in time of arrival, which can occur, for example, due to differences in group delay of the cable system and receiver filters at different frequencies. When time aligned, the original information content is retrieved or reconstituted by original bit stream At=Ar XOR Br XOR Cr XOR Dr;
original bit stream Bt=Ar XOR CR XOR Dr;
original bit stream Ct=Br XOR Cr XOR Dr; and
original bit stream Dt=Ar XOR Br XOR Dr.

It should be noted that a characteristic of the XOR operation is that the order in which the steps are performed does not affect the result.

A similar algorithm can be employed across time in a single stream either before or after across transponder application (or both) to give added security.

Figure 3:
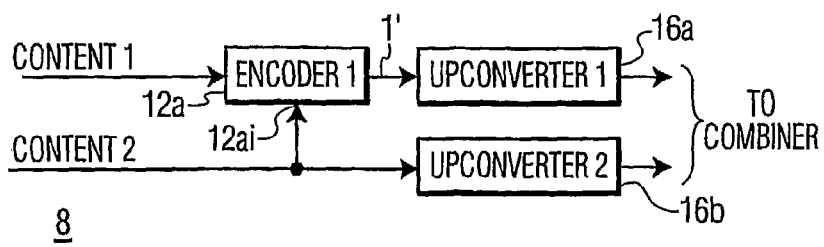
FIG. 3 is a simplified block diagram representing an alternative connection arrangement for a portion of FIG. 2.

Note that some channels can be sent in the clear and yet used to hide or encode the information in another bit stream. This is illustrated, in one form, in FIG. 3. In FIG. 3, encoder 12a receives content 1 for encoding, and receives content 2 at its encoding signal input port 12ai, for processing content 1 to produce processed content 1' for application to first upconverter 16a. Information content 2 is applied to upconverter 16b without encoding, so is transmitted in the clear.

As another example of sending some information in the clear but using them to hide information, assume that At=Ar and Bt=Br are sent in the clear. Then, encoding can be performed by making transmitted bit streams Cr=At XOR Ct XOR Bt; and
Dr=At XOR Ct XOR Dr.

The receiving arrangement 230 of FIG. 2 reconstitutes the desired bit streams as original bit stream At=Ar;
original bit stream Bt=Br;
original bit stream Ct=Ar XOR Br XOR Cr; and
original bit stream Dt=Br XOR Cr XOR Dr.

Note that the error correcting codes normally used across time could be used across transponders or physical channels for both error control and for security.

Figure 4:
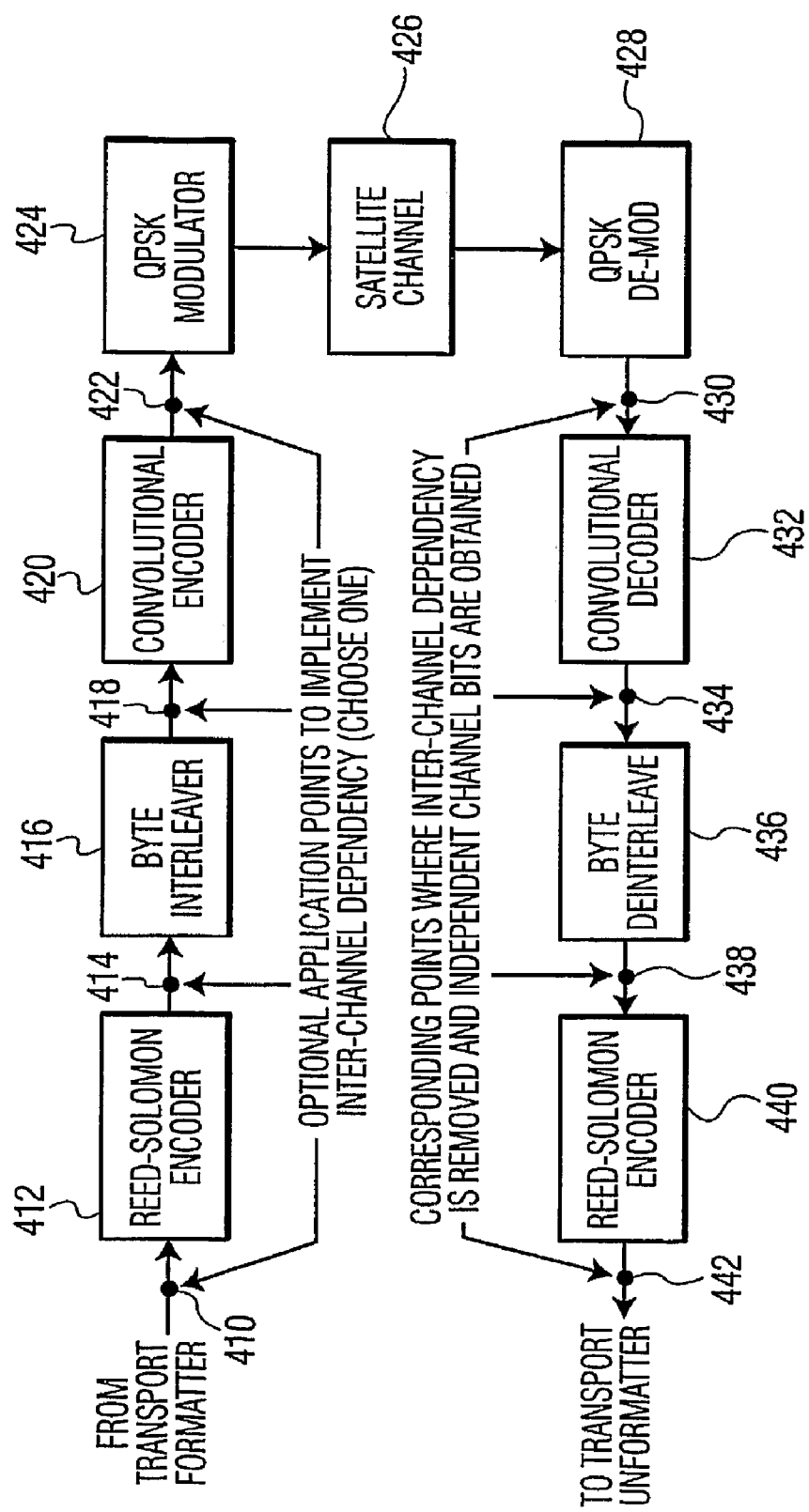
FIG. 4 illustrates a logic flow in an exemplary digital satellite and transmission system in accordance with the present principles.

FIG. 4 illustrates the logic flow in a digital satellite data transmission system. As illustrated in FIG. 4, the information flows from a transport formatter (not illustrated) by way of a path or node 410 to a block 412, representing an encoder of the Reed-Solomon type. After encoding, the information flows by way of a path or node 414 to a byte interleaver illustrated as a block 416. The interleaved information flows by way of a path or node 418 to a convolutional encoder illustrated as a block 420. The convolutionally encoded information flows by way of a path or node 422 to a modulator of the Quadrature Phase Shift Keyed (QPSK) type. The modulated information is uplinked to a satellite, as suggested by block 426, and downlinked to a QPSK demodulator 428. The demodulated information from demodulator 428 is applied by way of a path or node 430 to a convolutional decoder 432. The decoded information from block 432 is applied by way of a path or node 434 to a byte de-interleaver illustrated as a block 436. The de-interleaved information from de-interleaver 436 is applied by way of a path or node 438 to a further encoder block 440, which may be of the Reed-Solomon type. The information leaves encoder 440 for a transport unformatter (not illustrated) by way of a path or node 442. Paths or nodes 410, 414, 418, and 422 represent mutually alternative locations at which multichannel or inter-channel dependency may be introduced to the system, and paths or nodes 430, 434, 438, and 442 represent mutually alternative locations at which inter-channel dependency may be removed and independent channel bits obtained.

Figure 5:
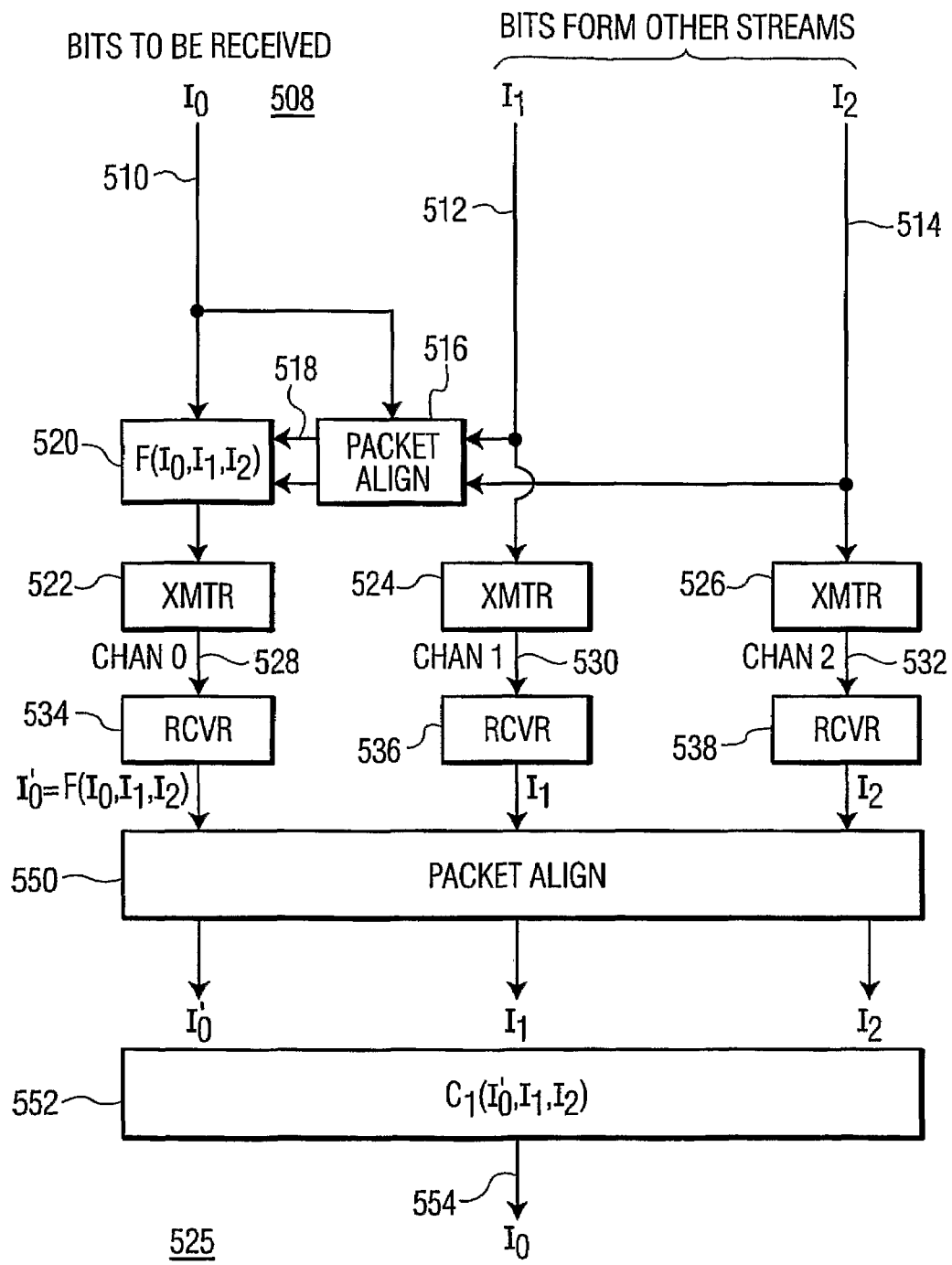
FIG. 5 is a simplified block diagram of an overall communications system according to an aspect of the present principles.

FIG. 5 is a simplified block diagram of an overall communication system according to an aspect of the invention, including a transmitter and receiver portion. In FIG. 5, bits $I_0$ to be secured are applied by way of a path 510 to a logic function block 520 and to a packet alignment block 516. Additional bits $I_1$ and $I_2$ from other data streams are applied by way of paths 512 and 514, respectively, to packet alignment block 516 and to transmitters (XMTR) 524 and 526. Packet alignment block 516 aligns the packets $I_1$ and $I_2$ in time or makes them concurrent with packets $I_0$, and applies the packets to function block 520 for encoding the packets $I_0$ with information $I_1$ and $I_2$ to thereby produce $I_0'$ information. The encoded $I_0'$ packets are applied to a transmitter block 522. Transmitters 522, 524, and 526 produce signals to be transmitted. The $I_0'$, $I_1$ and $I_2$ signals are transmitted over channel 0, channel 1, and channel 2 paths 528, 530, and 532, respectively, to receivers (RCVR) 534, 536, and 538, respectively. Receivers 536 and 538 recover the $I_1$ and $I_2$ information, respectively. Receiver 534 recovers the encoded $I_0'$ information. The recovered $I_0'$, $I_1$ and $I_2$ information are applied to a packet alignment function illustrated as a block 550, which aligns the received packets of information. The aligned $I_0'$, $I_1$ and $I_2$ packets of information are applied to a decoding block 552, which extracts the $I_0$ information.

The use of the invention makes it difficult for a "pirate" capturing a single bit stream from a single physical channel together with readily obtainable signals, such as the input-output (IO) signals from a decoding "smart card" to reverse engineer the security measures. The invention makes this technique difficult because bits from an unknown (to the pirate) set of physical channels, broadcast simultaneously or in temporal overlap, must be received and stored for analysis in order to perform the processing. Even if the pirate were somehow to obtain access to all the physical channels, it is necessary to determine which of a large number (possibly 4.3 billion) of dependency sets applies to a given secured channel. If one has the dependency set, it is still necessary to identify the dependency relationship (the XOR arrangement in the embodiments).

The difficulty facing the pirate can be increased if the receiver arrangement (230 of FIG. 2) is in the form of an integrated circuit or group of related integrated circuits, as many of the signals which would be useful for pirate analysis will not appear at any terminal of the IC or set of ICs, but are "consumed" internally.

The approach of the invention is based on a technological arrangement which is not now in common use, so presumably is not well known. Consequently, implementation of the method according to the invention could be accomplished without fanfare, or in a "stealth" fashion, to avoid alerting potential pirates.

Also, the use of multiple simultaneous physical channels could be used to transmit by separate paths (a) the content and (b) the key information for conventional encoding or encryption, so that access to multiple physical channels is necessary in order to attempt to extract the relevant information.

Those skilled in the art know that the processing of the multiple channels of content to generate processed signals can be accomplished in many possible manners, only one of which is the described XOR processing. In general, inter-channel dependency may be introduced with an N-input, 1-output logic function F, and removed with an N-input, 1-output logic function G, where F and G are such that I0=G (F(I0, I1, I2, . . . , In), I1, I2, . . . , In) is an identity. F=G for F=(I0 XOR H(I1, I2, . . . , In), where H is any n-variable logic function. An XOR cascade is such a function. In the context of this invention, separate physical channels may be implemented by frequency separation in the context of electromagnetic transmissions (television or radio, for example), or by separate packet timing in time-division multiplex systems, or by separate orthogonal codes in the context of code-division multiplexing.

A method according to an aspect of the invention is for securely transmitting first information ($I_0$) from a first location (508) to a second location (525) by way of a first channel (520, 522, 528, 534). The method comprises the steps of, at the first (508) and second (525) location, acquiring second ($I_1$) and additional ($I_2$) information which is independent of the first information, and time aligning (516, 550) the second ($I_1$) and additional ($I_2$) information at both the first (508) and second (525) locations. At the first location (508), the first information ($I_0$) is related with the second ($I_1$) and additional ($I_2$) information by means of a first function (F ($I_0$, $I_1$, $I_2$)) to thereby generate a transmitter signal ($I_0'$) for transmission, and the resulting signal ($I_0'$) is transmitted from the first location (508) to the second location (525) by way of a first signal channel (528). At the second location (525), the transmitter signal ($I_0'$) is related to the second ($I_1$) and additional ($I_2$) information with a second function (G($I_0$, $I_1$, $I_2$)) which is the reverse of the first function (F ($I_0$, $I_1$, $I_2$)) to thereby recover the first information ($I_0$). In one particular mode of the method, the first and second functions are XOR functions. The step of acquiring the second ($I_1$) and additional ($I_2$) information at the second location (525) may includes the steps of receiving the second ($I_1$) and additional ($I_2$) information by way of individual, independent signal channels (512, 524, 530, 536; 514, 526, 532, 538). In a particularly advantageous version of this method, at least some of the second ($I_1$) and additional ($I_2$) information is transmitted from the first location (508) to the second location (525). The step of transmitting at least some of the second ($I_1$) and additional ($I_2$) information from the first location (508) to the second location (525) may be performed by way of at least one signal channel (512, 524, 530, 536; 514, 526, 532, 538) independent of the first signal channel (520, 522, 528, 534). The step of transmitting at least some of the second ($I_1$) and additional ($I_2$) information from the first location (508) to the second location (525) may be performed by transmitting each of the second ($I_1$) and additional ($I_2$) information by way of a single signal channel independent of the first signal channel for each individual one of the second and additional information (512, 524, 530, and 536 for $I_1$; 514, 526, 532, and 538 for $I_2$). In a particularly advantageous version of the method, the step of at the second location (525), relating the transmitter signal ($I_0'$) to the second ($I_1$) and additional ($I_2$) information with a second function (G($I_0$, $I_1$, $I_2$)), is performed in concert with a receiver (230) able to simultaneously receive multiple channels including the first signal channel, and the signal channels for each individual one of the second and additional information.

A method according to an aspect of the invention is for securely transmitting first and second information from a first location (8) to a second location (224). The method comprises the step of processing the first information (1) by means of at least the second information (N) to thereby generate processed first information (1'). The second information (N) is processed by means of at least the first information (1) to thereby generate processed second information (N'). The processed first (1') and second (N') information are transmitted separately by way of independent first (f1) and second (fN) physical channels, respectively, to the second location (224). At the second location (224) the processed first information (1') is reverse processed by use of at least the processed second information (N'). Reverse processing of the processed second information (N') may be done by the use of at least the processed first information (1').

In a particular mode of the method, the step at the second location (224) of reverse processing the processed first information (1') by use of at least the processed second information (N') includes the step of independently receiving the processed first information (1') from the first independent channel (f1) and independently receiving the processed second information (N') from the second independent channel (fN). In a preferred mode of this method, this latter step is performed by an integrated circuit.

According to another aspect of the invention, a receiver (230) is provided for simultaneously recovering at least first information (1) received in processed form (1') by way of a first independent physical channel (f1) and second information (N) by way of a second independent physical channel (f2). The first information (1) transmitted over the first physical channel (f1) is processed before transmission in conjunction with second information (2) to generate processed or encoded information (1'). The second information (N') is transmitted to the receiver (230) over a second independent channel (fN). The receiver comprises means (240a) for receiving the processed first information (1') from the first physical channel (f1), and also comprises means (240N) for receiving the second information (N) from the second independent channel (fN). A processing means (242) processes the first processed information (1') in conjunction with the second information (N) to extract the first information (1) from the first processed information (1'). In that case in which the information transmitted over the second channel (fN) is encoded to form second processed information (N'), the processing means (242) also extracts the original second information (content N), and for this purpose the receiver (230) comprises further processing means for processing the first processed information (1') with the second information (N') to extract information relating to the form of the second information (N) before the processing with the first information (1).

In a preferred embodiment of this receiver, all or most of the described functions are contained or lie within a single integrated circuit.

What is claimed is

1. A receiver apparatus, comprising:
   a plurality of receivers capable of simultaneously receiving a plurality of program signals from respective independent channels associated with each of the receivers; and
   decoder, coupled to the plurality of receivers, for processing a first encoded program signal received from a first transmission channel using a first function and a second program signal received from a second transmission channel, which is independent of the first transmission channel, to thereby decode the first program signal.

2. The receiver apparatus of claim 1, wherein
   the decoder includes means for time aligning the first encoded program signal with the second program signal prior to decoding the first encoded program signal.

3. The receiver apparatus of claim 1, wherein
   the decoder decodes the first encoded program signal using the second program signal and the first function during a first period of time, and decodes the first encoded program signal using the second program signal and a second function during a second period of time.

4. The receiver apparatus of claim 1, wherein
   the decoder decodes the first encoded program signal using the second program signal received from a second transmission channel and the first function during a first period of time, and decodes the first encoded program signal using a third program signal received from a third transmission channel, which is independent of the first transmission channel, during a second period of time.

5. The receiver apparatus of claim 4 wherein
   the decoder changes the decoding between the second program signal and the third program signal on a periodic basis.

6. The receiver apparatus of claim 1, wherein
   the second program signal is encoded, and the decoder decodes the second program signal using the decoded first program signal and a second function.

7. A receiver apparatus, comprising:
   means for simultaneously receiving a plurality of program signal transmitted via respective independent transmission channels;
   decoder means, coupled to the receiving means, for processing a first encoded program signal received from a first transmission channel using a first function and a second program signal received from a second transmission channel, which is independent of the first transmission channel, to thereby decode the first program signal.

8. The receiver apparatus of claim 7, wherein
   the decoder means includes means for time aligning the first encoded program signal with the second program signal prior to decoding the first encoded program signal.

9. The receiver apparatus of claim 7, wherein
   the decoder means decodes the first encoded program signal using the second program signal and the first function during a first period of time, and decodes the first encoded program signal using the second program signal and a second function during a second period of time.

10. The receiver apparatus of claim 7, wherein
    the decoder, means decodes the first encoded program signal using the second program signal received from a second transmission channel and the first function during a first period of time, and decodes the first encoded program signal using a third program signal received from a third transmission channel, which is independent of the first transmission channel, during a second period of time.

11. A method for processing an encoded program signal, comprising the steps of:
    simultaneously receiving the encoded program signal over a first transmission channel and a second program signal over a second transmission channel, which is independent of the first transmission channel; and
    decoding the encoded program signal using the second program signal and a first function.

12. The method according to claim 11, further comprising the step of
    time-aligning the encoded program signal and the second program signal prior to decoding the encoded program signal.

13. The method according to claim 11, wherein
    the decoding step comprises decoding the encoded program using the second program signal and the first function during a first time period, and decoding the encoded program using the second program signal and a second function during a second time period.

14. The method according to claim 11, wherein
    the receiving step comprises simultaneously receiving a third program signal on a third transmission channel that is independent of the first transmission channel,
    the decoding step comprises decoding the encoded program signal using the second program signal and the first function during a first time period, and decoding the encoded program signal using the third program signal and the first function during a second time period.

15. The method according to claim 11, wherein
    the second program signal is encoded, and the decoding step comprises decoding the second program signal using the encoded program signal and the first function.

* * * * *